(12) United States Patent
Porte

(10) Patent No.: US 8,096,105 B2
(45) Date of Patent: Jan. 17, 2012

(54) TURBOJET ENGINE WITH ATTENUATED JET NOISE

(75) Inventor: Alain Porte, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 942 days.

(21) Appl. No.: 12/090,857

(22) PCT Filed: Oct. 17, 2006

(86) PCT No.: PCT/FR2006/002326
§ 371 (c)(1),
(2), (4) Date: Apr. 19, 2008

(87) PCT Pub. No.: WO2007/045754
PCT Pub. Date: Apr. 26, 2007

(65) Prior Publication Data
US 2008/0271431 A1 Nov. 6, 2008

(30) Foreign Application Priority Data
Oct. 19, 2005 (FR) ...................................... 05 10627

(51) Int. Cl.
*F02K 1/00* (2006.01)
*F02K 1/28* (2006.01)
(52) U.S. Cl. ............................ 60/231; 60/770; 60/226.3

(58) Field of Classification Search .................... 60/231, 60/226.1, 226.3, 770; 239/265.13, 265.17; 181/213
See application file for complete search history.

(56) References Cited

U.S. PATENT DOCUMENTS
| 6,845,607 B2* | 1/2005 | Lair ................................ 60/263 |
| 2005/0214107 A1* | 9/2005 | Gutmark et al. .................. 415/1 |

FOREIGN PATENT DOCUMENTS
| EP | 1 004 759 | 5/2000 |
| WO | 02/29232 | 4/2002 |
| WO | 2005/021934 | 3/2005 |

OTHER PUBLICATIONS

International Search Report dated Apr. 3, 2007 w/ English translation.
Written Opinion of the ISA w/ English translation.

* cited by examiner

*Primary Examiner* — William H Rodriguez
*Assistant Examiner* — Andrew Nguyen
(74) *Attorney, Agent, or Firm* — Dickinson Wright PLLC

(57) ABSTRACT

A plurality of hatches are distributed on the rear periphery of an engine cowl. The hatches are opened only when turbojet engine power is greater than cruising power. In an open position, the hatches draw hot air jets passing through an intermediate chamber before ejecting the jets through longitudinally-distributed communication components.

15 Claims, 13 Drawing Sheets

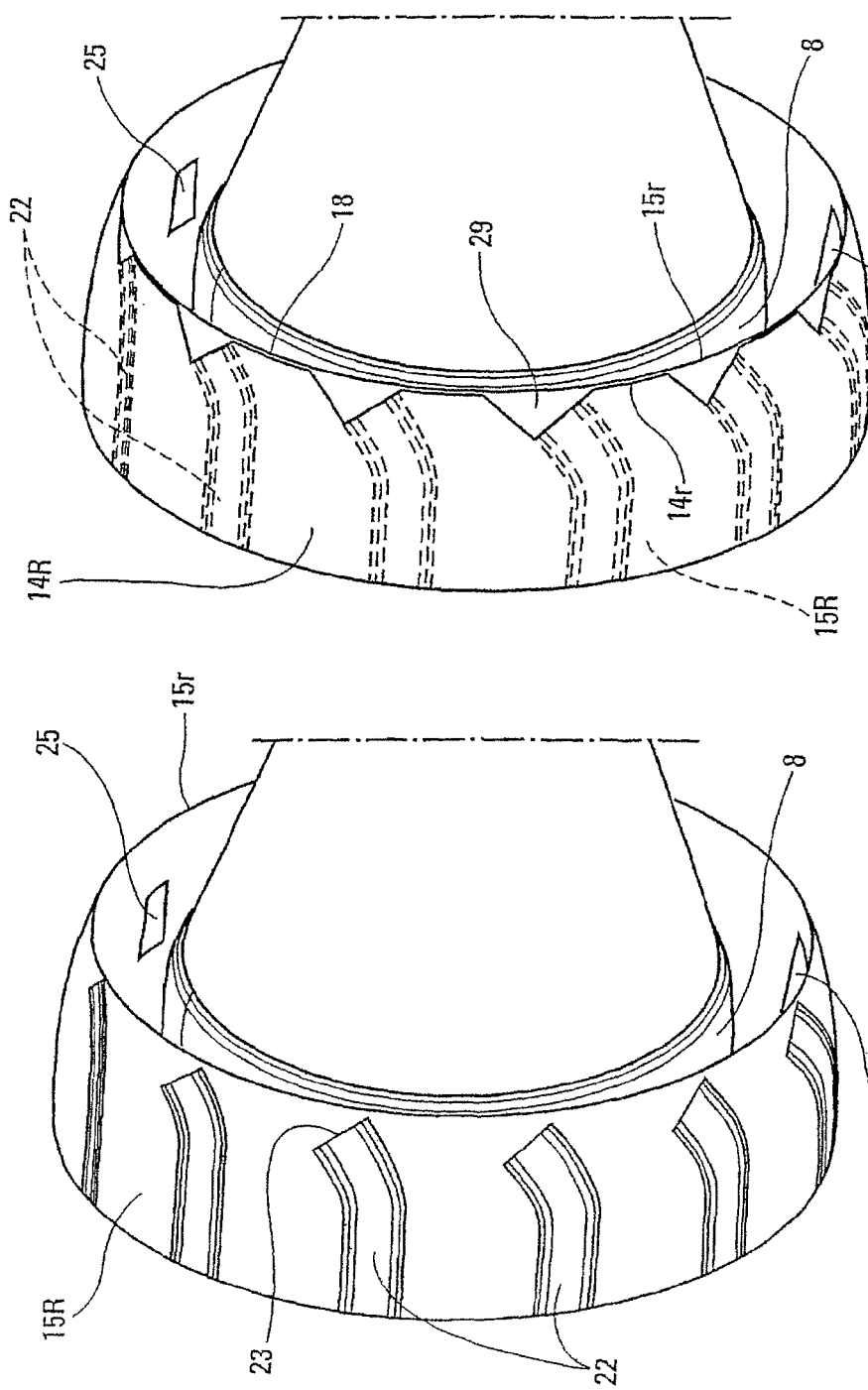

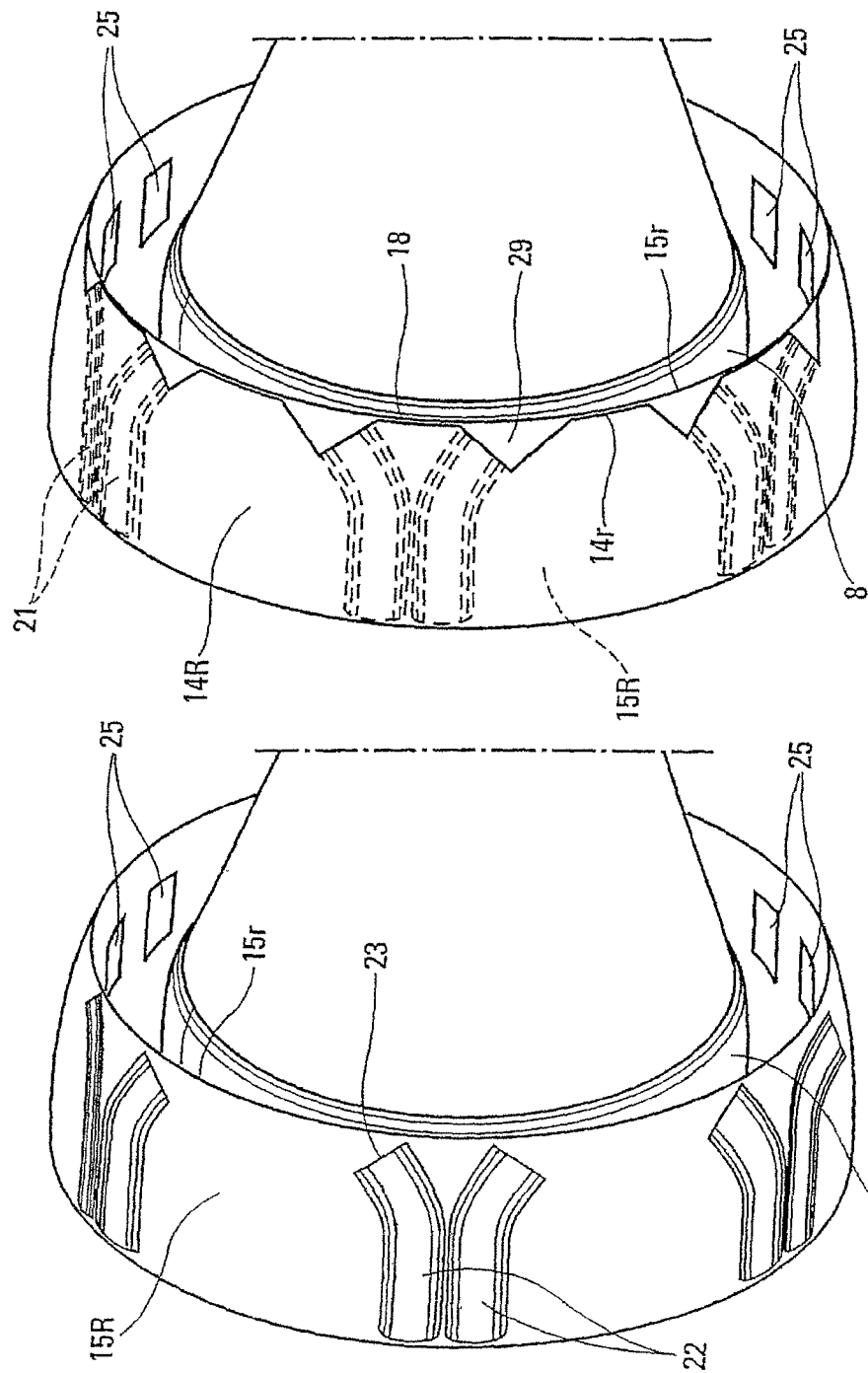

TURBOJET ENGINE WITH ATTENUATED JET NOISE

FIELD OF THE INVENTION

The present invention relates to a turbine engine with attenuated jet noise, designed to be fitted to an aircraft.

BACKGROUND OF THE RELATED ART

It is known that, at the rear of a turbofan turbine engine, the cold flow and the hot flow travel in the same direction toward the downstream of said turbine engine and come into contact with one another. Since the speeds of said flows are different from each other, the result of this is fluid shear of penetration between said flows, said fluid shear generating noise, called "jet noise" in aviation technology.

To attenuate such a jet noise, thought has already been given to generating turbulence at the boundary between said hot flow and said cold flow. It has therefore already been proposed to make recesses in the outlet edge of the hot flow, said recesses being distributed on the periphery of said outlet edge and each of them generally having at least the approximate shape of a triangle, whose base is indistinguishable from said outlet edge and whose apex is in front of this outlet edge. These recesses are usually called "chevrons" in aviation technology.

These known chevrons are effective in attenuating the jet noise; however, they have the disadvantage of generating considerable drag.

In addition, it must be noted that the reduction of the jet noise is truly useful only when the aircraft fitted with said turbine engine is close to the ground with a high speed of said turbine engine, in order not to annoy the people who are in an airport or who reside in the vicinity of the latter. On the other hand, in the cruising phase at high altitude, the attenuation of the jet noise is of only little importance.

Therefore, at cruising speed, the performance of the aircraft is unnecessarily penalized by said chevrons creating increased drag.

SUMMARY OF THE INVENTION

The object of the present invention is to remedy this disadvantage, by generating turbulence at the boundary between said hot and cold flows only when the attenuation of the jet noise is really useful.

Accordingly, according to the invention, the turbofan turbine engine for an aircraft, comprising:
- a hollow nacelle having a longitudinal axis and comprising, at the front, an air inlet and, at the rear, an air outlet;
- a fan placed axially in said nacelle opposite said air inlet and capable of generating the cold flow of said turbine engine;
- a generator placed axially in said nacelle, behind said fan, said generator being capable of generating the axial hot flow of said turbine engine surrounded by said cold flow and being enclosed in an engine cowl; and
- a fan channel inner cowl coaxially surrounding said hot flow generator so as:
  - to delimit with the nacelle a channel of annular section for said cold flow, a channel that terminates in said air outlet of the nacelle;
  - to delimit with said engine cowl an intermediate chamber of annular section; and
  - to converge via its rear portion with the rear portion of said engine cowl so that the respective rear edges of these rear portions form the edge of the outlet orifice of said hot flow at the rear portion of said intermediate chamber, is noteworthy:
- in that, provided in the rear portion of said intermediate chamber are communication means placed about said longitudinal axis and capable of placing said intermediate chamber in communication with the outside, in the vicinity of the boundary between said cold flow and said hot flow;
- in that a plurality of hatches are provided that are arranged in the rear portion of said engine cowl, while being distributed on the periphery of the latter rear portion;
- in that said hatches are opened only when the speed of said turbine engine is greater than a threshold corresponding to at least the cruising speed of the aircraft; and
- in that, in the open position, said hatches draw off, from said hot flow, individual jets of hot air flowing into said intermediate chamber before leaving the latter through said communication means while being distributed about said longitudinal axis.

Therefore, in the flight phases in which the engine speed is less than said threshold, the hatches are closed and the turbine engine of the invention operates like a turbine engine with no chevrons, with no attenuation of the jet noise nor increase in drag.

On the other hand, on take-off, the speed of the turbine engine is high and greater than said threshold, so that the hatches are opened and draw off individual jets of hot air. These individual jets, distributed on the periphery of the rear portion of the engine cowl (in accordance with the distribution of said hatches), enter said chamber and leave it via said communication means, generating turbulence at the boundary between the hot and cold flows, in the manner of chevrons. They therefore cause a reduction in the jet noise, accompanied by an increase in drag.

It will be noted that, when the aircraft is in the approach phase for the purpose of a landing (engine at low speed), but the pilot is obliged to reapply throttle because said landing is momentarily impossible, the engine speed when the throttle is reapplied is high and comparable to that of take-off. Consequently, on such a reapplication of the throttle, the hatches are opened and the jet noise is attenuated, which is favorable since the aircraft is then close to the ground.

It will also be noted that, when the aircraft comprises a plurality of turbine engines, of which at least one has failed, the speed of the turbine engines that are operating is greater than their normal speed to compensate for said failure and, in this case, it is advantageous that said hatches are opened to attenuate the noise generated.

Said communication means may comprise a plurality of individual communication openings distributed on the periphery of the rear portion of said intermediate chamber.

Such individual openings may be specifically made for the needs of the present invention. However, if, as is described in French patent application No. 05 09260 filed on Sep. 12, 2005 in the name of the applicant, on the periphery of said outlet orifice of the hot flow, only one of said rear edges of said fan channel inner cowl or of said engine cowl is notched by recesses capable of attenuating the jet noise of the turbine engine without generating excessive drag, it is advantageous that said recesses form at least in part said communication means. In addition, to optimize the blow-through of said recesses, and therefore increase the attenuation of the jet noise, it is preferable, if each recess has at least the approximate shape of a triangle as indicated above, that an individual jet of hot air flows out in the corresponding recess through a side edge of said recess.

Furthermore, if, in a usual manner in certain turbine engines, said rear edges of the fan channel inner cowl and of the engine cowl arrange between them a slot, at least portions of said slot may also form at least in part said communication means.

Preferably, with each hatch is associated a closing and opening system, sensitive to the value of a physical magnitude characterizing the state of said hot flow.

Therefore, the closing and opening of said hatches may be automatic according to the engine speed.

For example, such a closing and opening system may comprise a calibrated spring, acting on the corresponding hatch in the closing direction. Therefore, by choosing the appropriate calibration for this spring, the hatch may remain closed when the value of the pressure of said hot flow is less than the high values that said pressure has at high engine speeds and is open in the converse case.

However, preferably, each closing and opening system of a hatch comprises a bimetallic strip being triggered for a hot flow temperature corresponding to the take-off speed.

In an advantageous embodiment, each hatch comprises an elastic strip capable of interacting with an opening made in said rear portion of the engine cowl, said elastic strip being fixedly attached to said rear portion along an edge of said opening and said bimetallic strip being fixedly attached, on one side, to said rear portion and, on the other side, to said elastic strip.

Preferably, so as not to create obstacles in the path of the hot flow (which would risk degrading the performance of said turbine engine), it is advantageous for said hatches to open in the direction of said intermediate chamber.

For a reason similar to the foregoing, the system for closing and opening each hatch is advantageously on the side of said intermediate chamber.

On the latter side, each hatch may be protected by a rearward-opening casing to allow said jets of hot air to reach said communication means.

Advantageously, particularly in order to be able to adjust the inclination of said jets of hot air relative to the edge of the outlet orifice of the hot flow, means for the guidance of said jets of hot air are provided behind said hatches. Such guidance means may consist of walls, obstacles, etc. They may also consist of said casings for protecting the hatches.

BRIEF DESCRIPTION OF THE DRAWINGS

The figures of the appended drawing will clearly explain how the invention may be embodied. In these figures, identical reference numbers indicate similar elements.

FIG. 10 shows a variant embodiment of the invention, in a view similar to FIG. 7.

FIG. 11 illustrates the variant embodiment of FIG. 10, the rear portion of the fan channel inner cowl being represented as an overlay of said rear portion of the engine cowl and comprising chevrons.

FIGS. 12 and 13 further illustrate another variant embodiment in views comparable to FIGS. 10 and 11.

FIG. 23 shows, in a view similar to FIG. 11, an exemplary embodiment of the rear portion of the hot flow generator of the turbine engine of FIG. 15 that can be used in the second variant of FIGS. 21 and 22.

DETAILED DESCRIPTION OF THE INVENTION

Figure 1:
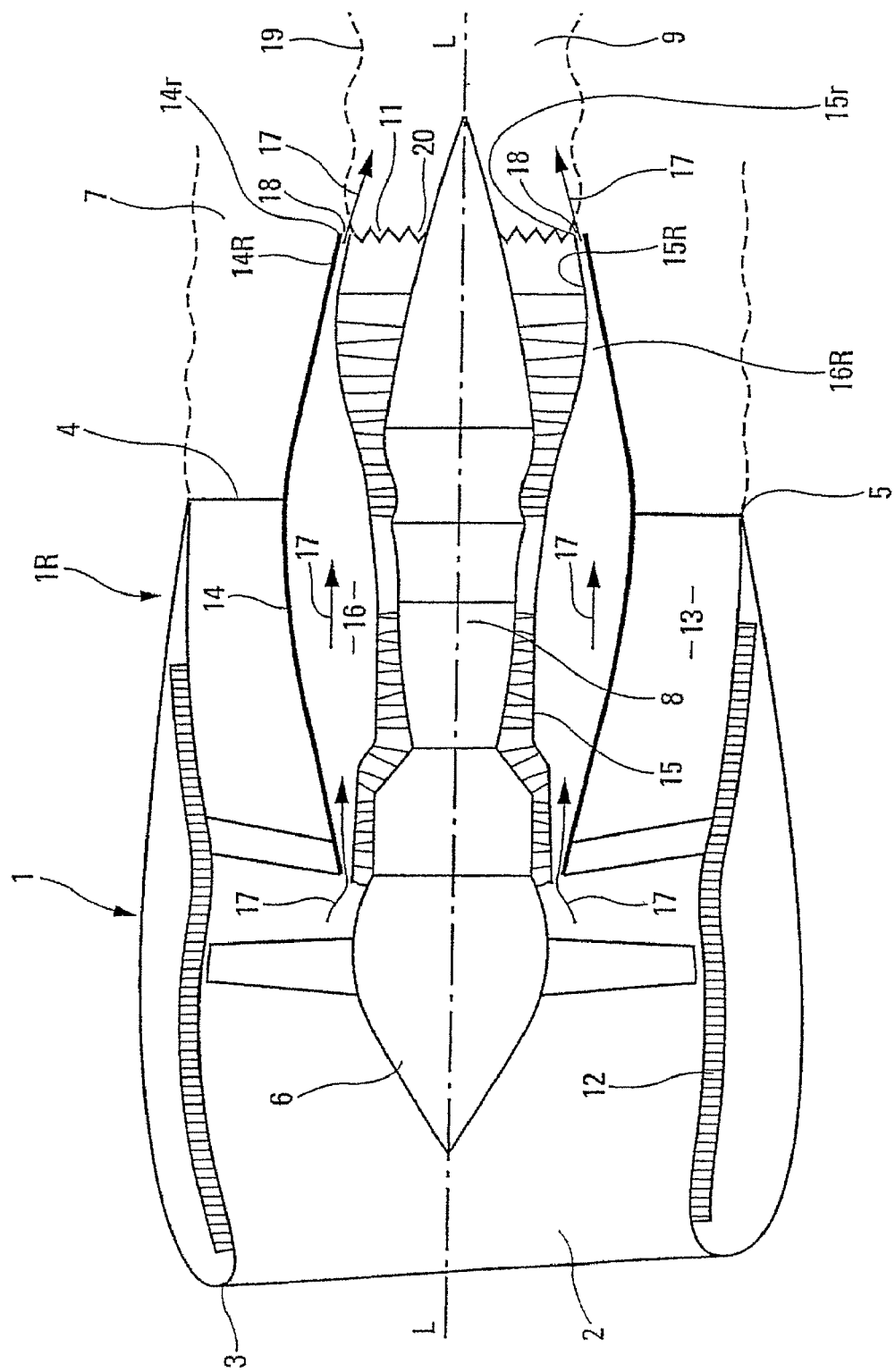
FIG. 1 represents, in schematic axial section, a known turbine engine, designed to be enhanced by the present invention.

The turbofan turbine engine of a known type for an aircraft, shown in FIG. 1, comprises a hollow nacelle 1 with a longitudinal axis L-L, comprising, at the front, an air inlet 2 provided with a leading edge 3 and, in its rear portion 1R, an annular air outlet 4 provided with a trailing edge 5.

Placed axially inside said hollow nacelle 1 are:
- a fan 6 directed toward the air inlet 2 and capable of generating the cold flow 7 for the turbine engine;
- a central generator 8 comprising, in a known manner and not shown, low-pressure and high-pressure compressors, a combustion chamber and low-pressure and high-pressure turbines, said generator 8 generating the axial hot flow 9 of said turbine engine surrounded by said cold flow 7 and being enclosed in an engine cowl 15;
- a fan channel inner cowl 14 surrounding said hot flow generator 8; and
- sound attenuation coverings 12, designed to absorb the internal noises generated by the fan 6 and the hot flow generator 8.

The fan channel inner cowl 14 delimits with the nacelle 1 a fan channel 13, of annular section, culminating at the annular outlet 4. The cold flow 7 passes through the fan channel 13 and leaves the turbine engine through said annular outlet 4.

In addition, the cowl 14 delimits with the engine cowl 15 an intermediate chamber 16, of annular section, surrounding said central generator 8 and traversed longitudinally by an air flow 17 for the ventilation of said central generator 8, the air flow 17 being drawn off at the front from the cold flow 7.

The respective rear portions 14R and 15R of said cowls 14 and 15 converge on each other and their respective rear edges 14r and 15r form the edge of the outlet orifice 11 of the hot flow 9 at the rear portion 16R of the intermediate chamber 16, while arranging between them a slot 18, through at least portions of which said ventilation air flow 17 escapes.

Therefore, at the outlet of the known turbine engine represented in the figure, the central hot flow 9 is surrounded by the annular cold flow 7. Clearly, at the boundary 19 between these two flows, the fluids in contact have different speeds, which at least partly generates the jet noise described above.

To attenuate this jet noise, the edge of the outlet orifice 11 of the hot flow 9 is provided, in a known manner, with recesses 20 distributed on its periphery. These recesses 20 pass right through the thickness of the two rear edges 14r and 15r and generate considerable drag.

As mentioned above, the object of the present invention is to remove these through-recesses and, to do this, to modify the rear portion 16R of the intermediate chamber 16 in the manner illustrated schematically by FIGS. 2 to 7.

As these figures show, on the periphery of the rear portion 15R of the engine cowl 15 and on the side of the intermediate chamber 16, a plurality of hatches 21 are arranged and distributed. It will be noted that, in FIG. 7, each hatch 21 is protected, on the side of the intermediate chamber 16, by a casing 22 provided with an opening 23 directed toward the rear of the turbine engine.

Figure 6:
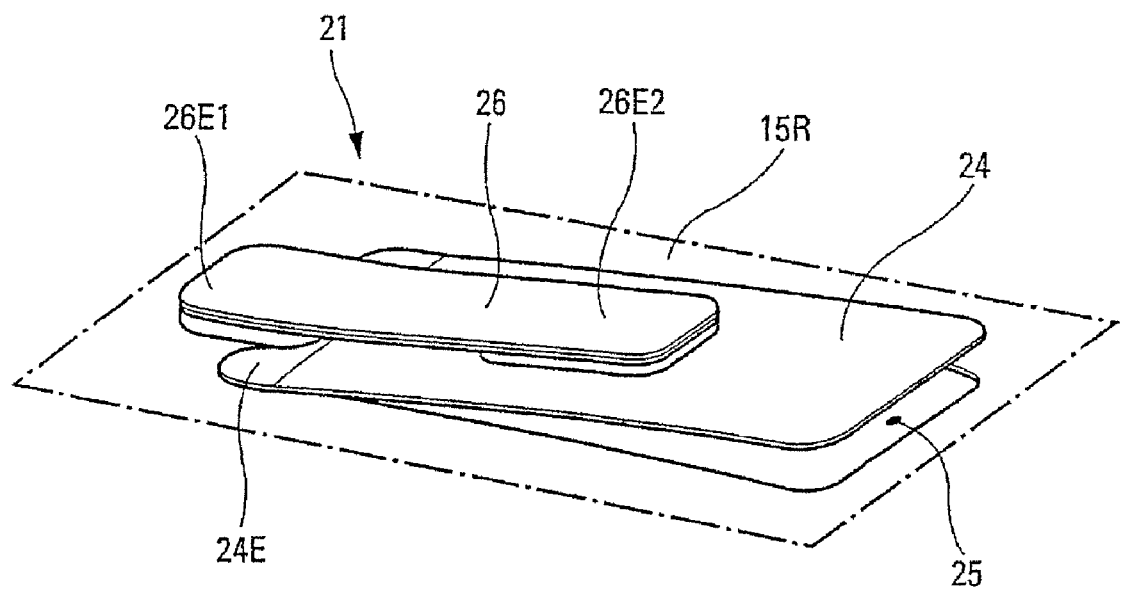
FIG. 6 shows in perspective an exemplary embodiment of the hatches used in the implementation of the present invention.

Each hatch 21 comprises an elastic strip 24 capable of closing off an opening 25 made in said rear portion 15R of the engine cowl 15 (see FIG. 6). Along an edge of said opening 25, one end 24E of said elastic strip 24 is fixedly attached, for example by welding, to said rear portion 15R. In addition, a bimetallic strip system 26 is fixedly attached, at one of its ends 26E1, to said rear portion 15R and, at its other end 26E2, to said elastic strip 24. The bimetallic strip system 26 is designed to deform only when the temperature reached by the hot flow 9 corresponds to a speed of the turbine engine that is greater than a threshold at least equal to the cruising speed, said threshold corresponding for example to the take-off speed or to a high speed capable of compensating for the failure of at least one other turbine engine of the aircraft.

Therefore, for any turbine engine speed below said threshold, the bimetallic strip system 26 is not deformed and the strip 24 closes off the opening 25 (see FIG. 2).

On the other hand, for a turbine engine speed greater than said threshold, the bimetallic strip system 26 deforms and the strip 24 is moved away from the rear portion 15R. The hatch 21 therefore opens (see FIGS. 3, 5 and 6). The result of this is therefore that said hatch 21 draws off, from the hot flow 9, a jet of hot air 9d, passing through the opening 23 of the casing 22, then passing into the intermediate chamber 16 before being discharged to the outside through at least portions of the slot 18.

Figure 2:
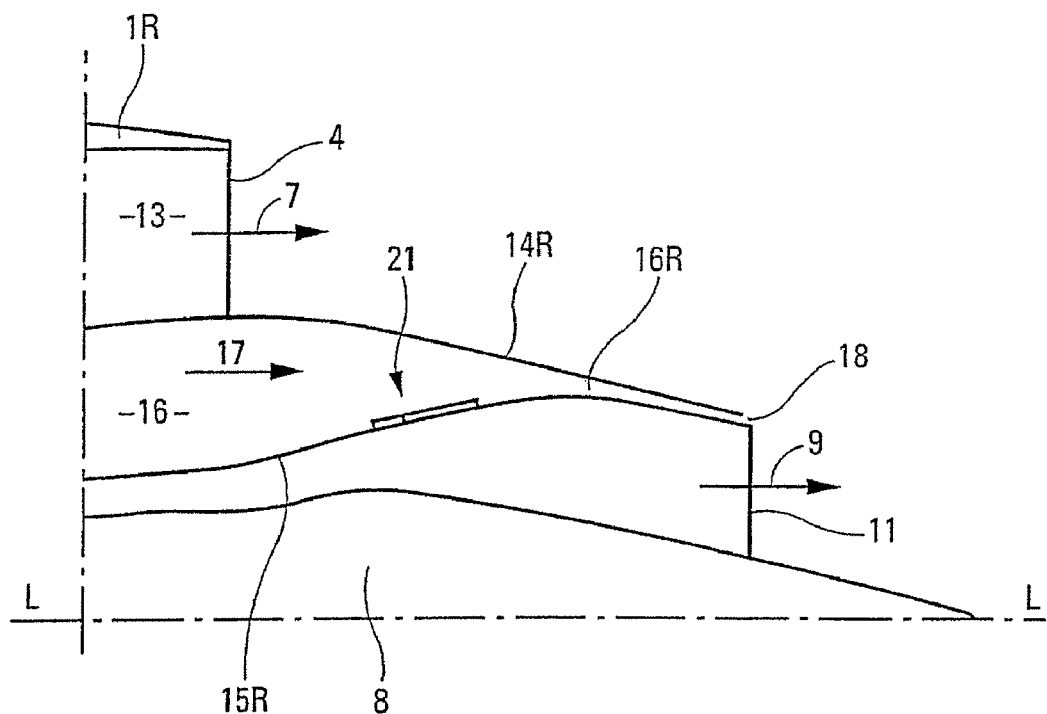
FIGS. 2 and 3 illustrate schematically the principle of the present invention applied to the turbine engine of FIG. 1.
Figure 3:
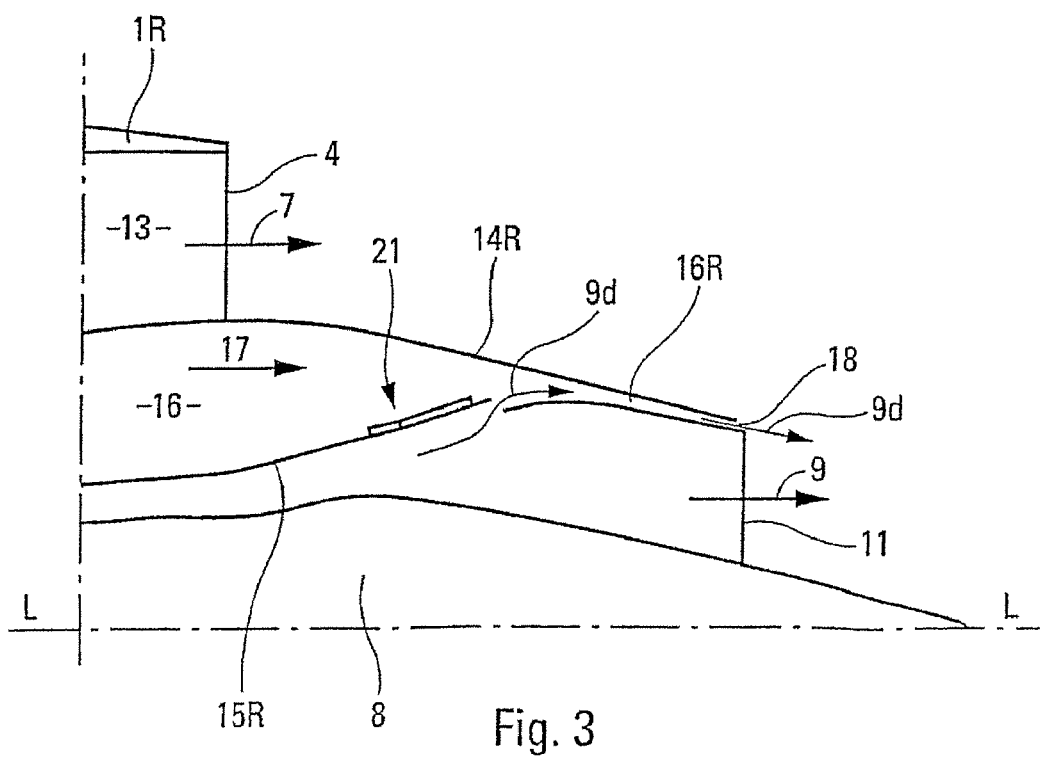
Figure 4:
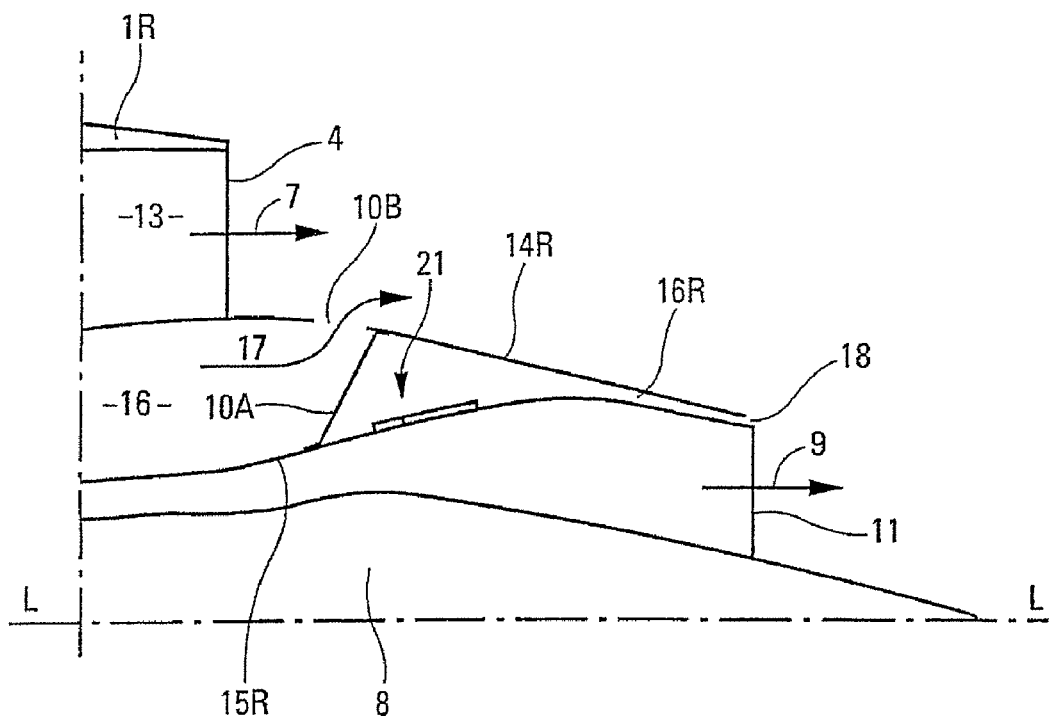
FIGS. 4 and 5 illustrate schematically, in views respectively similar to FIGS. 2 and 3, a variant application of the present invention to the turbine engine of FIG. 1.
Figure 5:
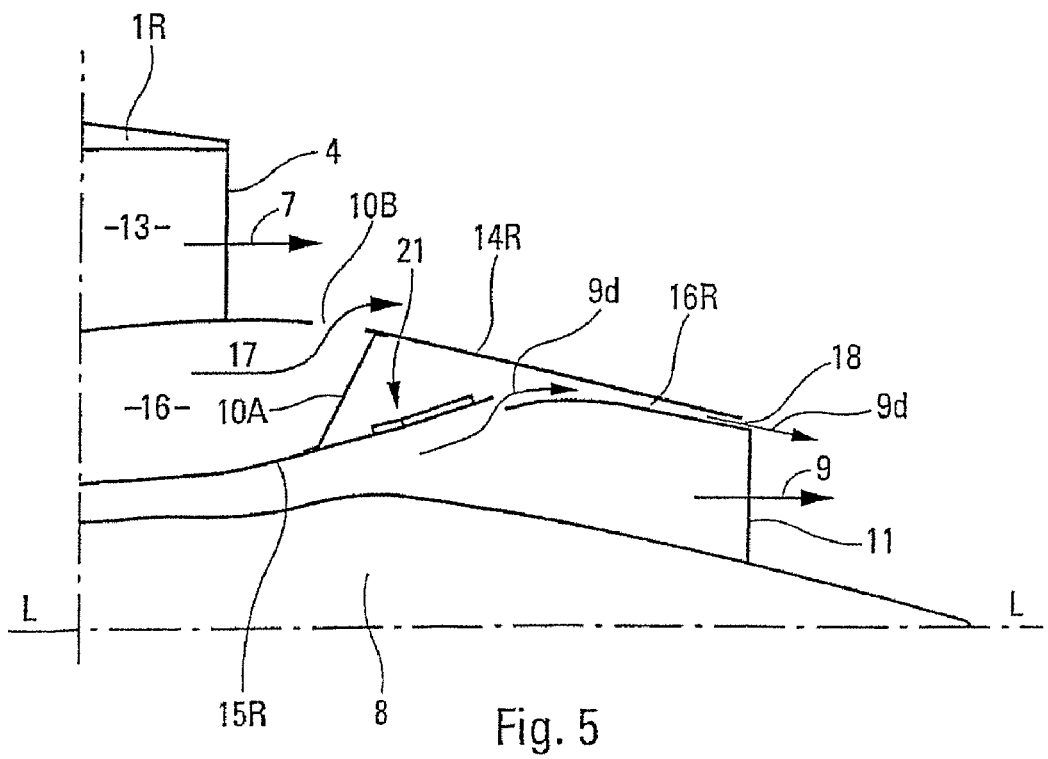

In the embodiment of FIGS. 2 and 3, the jets of hot air 9d leave the intermediate chamber 16 in common with the ventilation air 17, through the slot 18. On the other hand, in the embodiment of FIGS. 4 and 5, on the one hand a partition 10A inside the intermediate chamber 16 and, on the other hand, openings 10B in the fan inner cowl 14 have been provided in front of the hatches 21. Therefore, the ventilation air 17 can escape through the openings 10B, while only the jets of hot air 9d escape through at least portions of the slot 18.

If, as illustrated in FIGS. 2 to 5, the edge of the outlet orifice 11 of the hot flow 9 is smooth (that is to say not provided with the through-recesses 20 of FIG. 1), the turbine engine of the invention behaves, from the point of view of jet noise and below said speed threshold, like a known turbine engine not furnished with chevrons. On the other hand, above said threshold, it attenuates the jet noise like a turbine engine furnished with chevrons, even though it does not have any, because each jet of hot air 9d drawn off by each hatch 21 generates, at the rear of said turbine engine, turbulence similar to that produced by said recesses 20.

Figure 7:
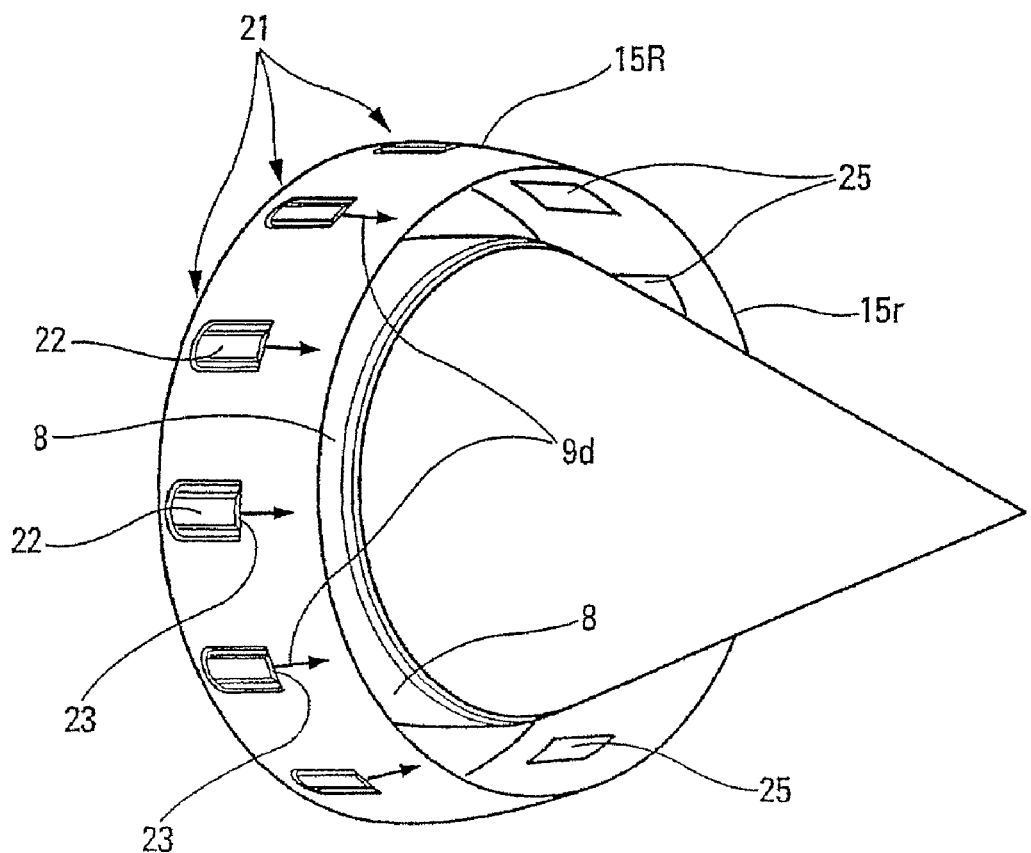
FIG. 7 shows in schematic perspective the rear portion of the engine cowl of the turbine engine corresponding to FIGS. 2 to 5, said rear portion being fitted with a plurality of hatches distributed on its periphery and protected by protective casings.

Naturally, although FIG. 7 shows the jets of hot air 9d as being parallel to the axial direction L-L, the orientation of said jets could be different, inclined relative to the edge of the outlet orifice 11 and not orthogonal as shown.

Figure 8:
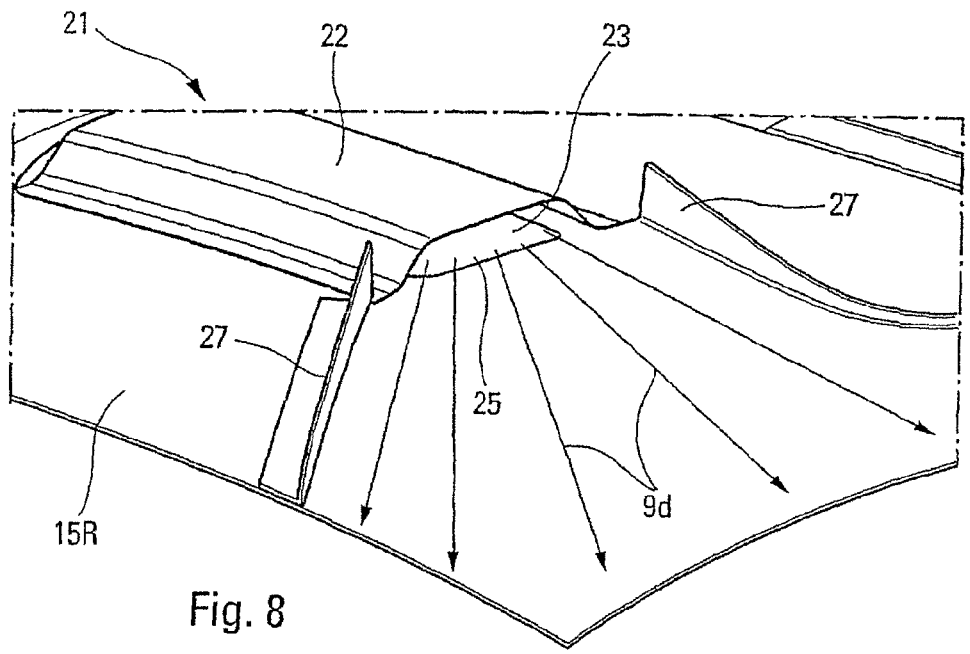
FIG. 8 illustrates, in enlarged perspective from the rear, a hatch protected by a protective casing and fitted with means for guiding the jet of hot air.
Figure 9:
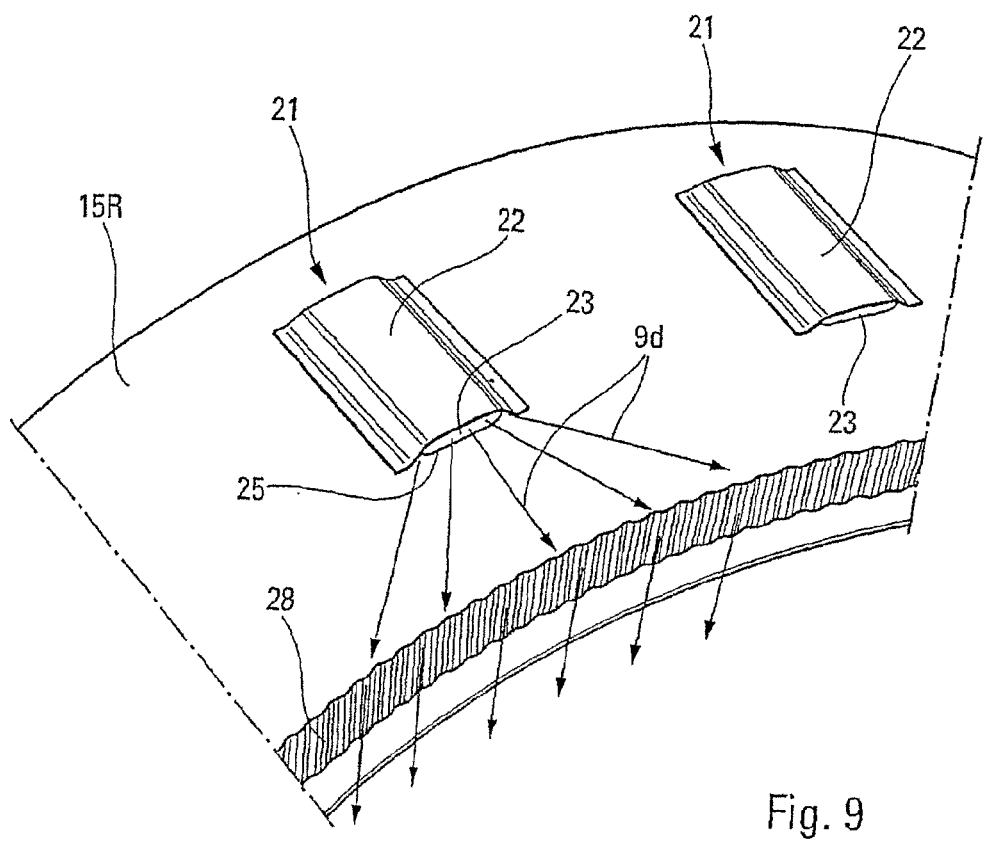
FIG. 9 illustrates, also in enlarged perspective from the rear, a variant embodiment of said guidance means associated with the hatches.

In addition, as illustrated in FIGS. 8 and 9, behind said hatches 21, guidance means 27, 28 can be provided to orient said jets of hot air 9d relative to the edge of the outlet orifice 11 of the hot gas 9. These guidance means may be walls 27, grooved obstacles 28 or similar members, forming orientation channels with the rear portion 14R of the fan cowl 14 (not shown in these figures).

In the embodiments of FIGS. 10, 11 and 12, 13, the means for guiding the jets of hot air 9d consist of the casings 22, formed for this purpose.

Furthermore, in the latter embodiments, the rear edge 15r of the rear portion 15R is smooth while the rear edge 14r of the rear portion 14R is notched by recesses 29 of triangular shape and the opening 23 of each casing 22 opens into a recess 29 through a side edge of the latter. Therefore, in this case, the jets of hot air 9d leave the rear portion 16R of the intermediate chamber 16 mainly through the recesses 29 opening into the slot 18.

Figure 14:
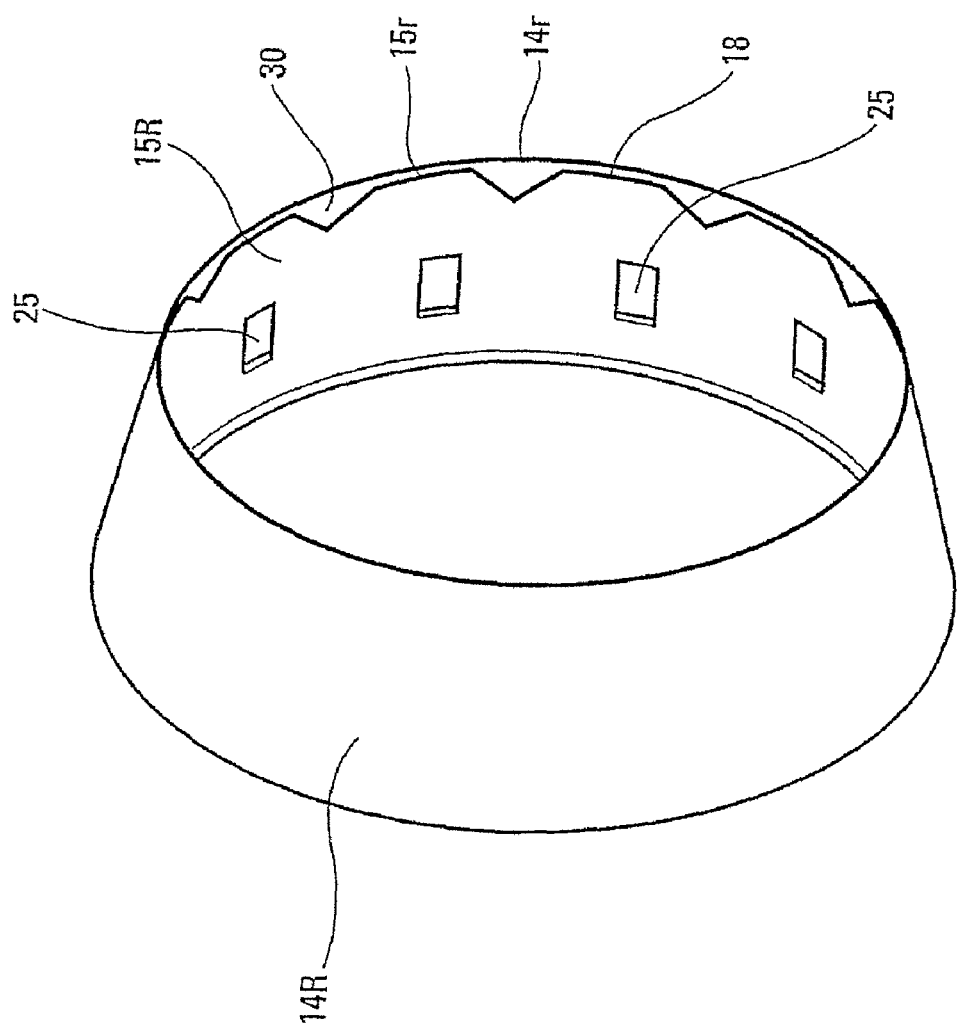
FIG. 14 is a variant embodiment of that of FIGS. 10 to 13.

In the variant of FIG. 14, the rear edge 14r is smooth and, on the contrary, the rear edge 15r of the rear portion 15R is notched with recesses 30, into which said casings 22 open, in a similar manner to what has been indicated above. Also, in this embodiment, the jets of hot air 9d leave the rear portion 16R of the intermediate chamber 16 mainly through the recesses 30 opening into the slot 18.

Figure 15:
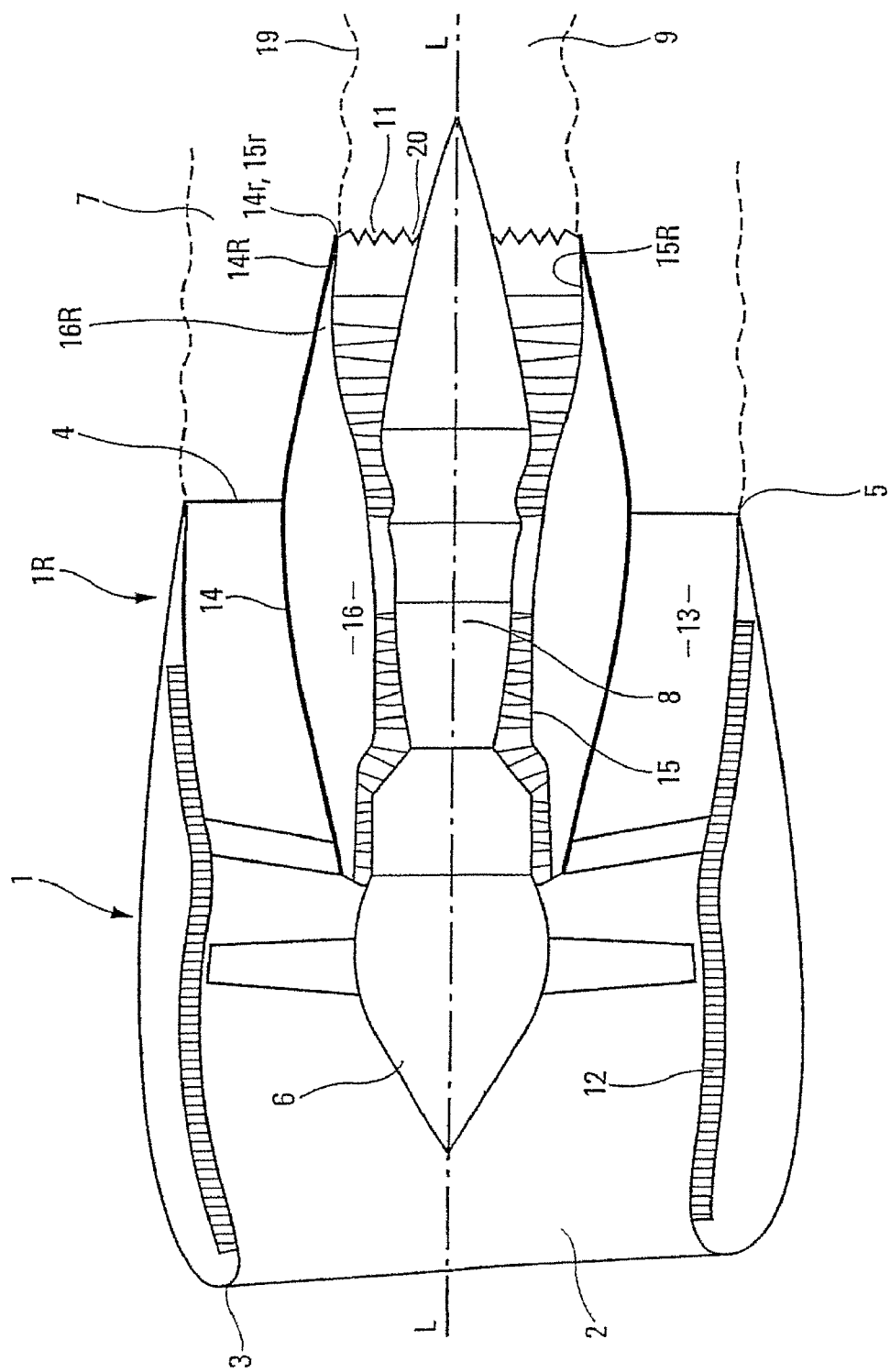
FIG. 15 represents, in schematic axial section, another known turbine engine, different from that of FIG. 1 and also intended to be enhanced by the present invention.

FIG. 15 shows a known turbine engine, similar to the turbine engine of FIG. 1, except with respect to the rear portion 16R of the intermediate chamber 16. In this case, the rear edges 14r and 15r are joined and do not arrange the slot 18 between them.

Figure 16:
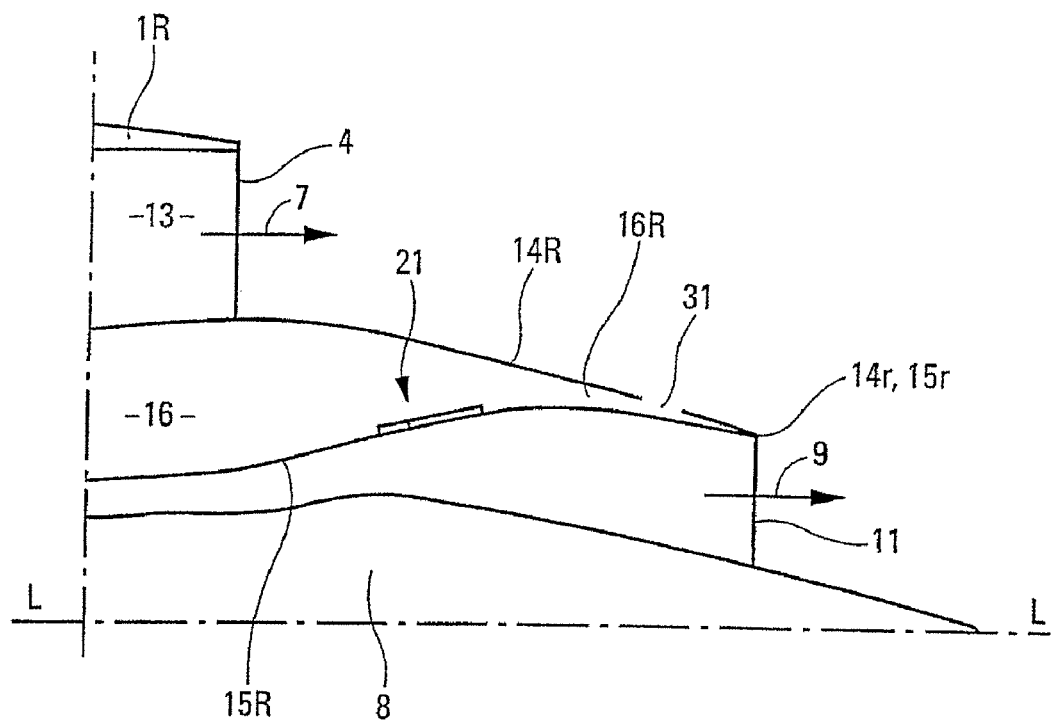
FIGS. 16 and 17 illustrate schematically, in views respectively similar to FIGS. 2 and 3, the principle of the present invention applied to the turbine engine of FIG. 15.
Figure 17:
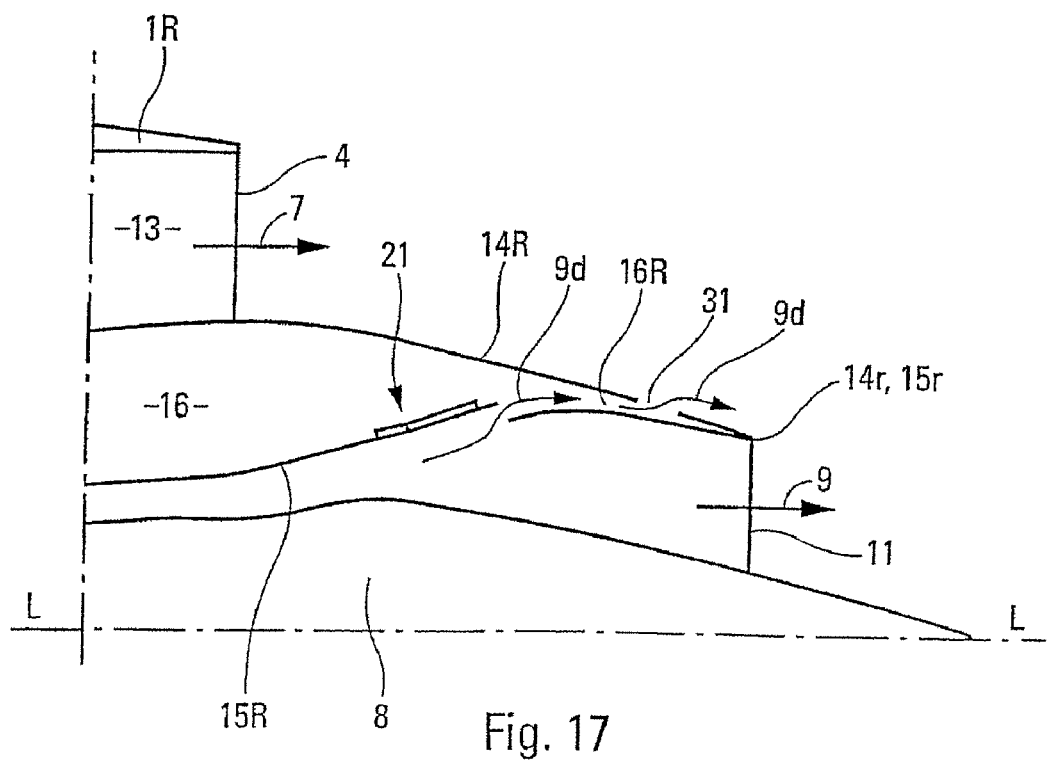
Figure 18:
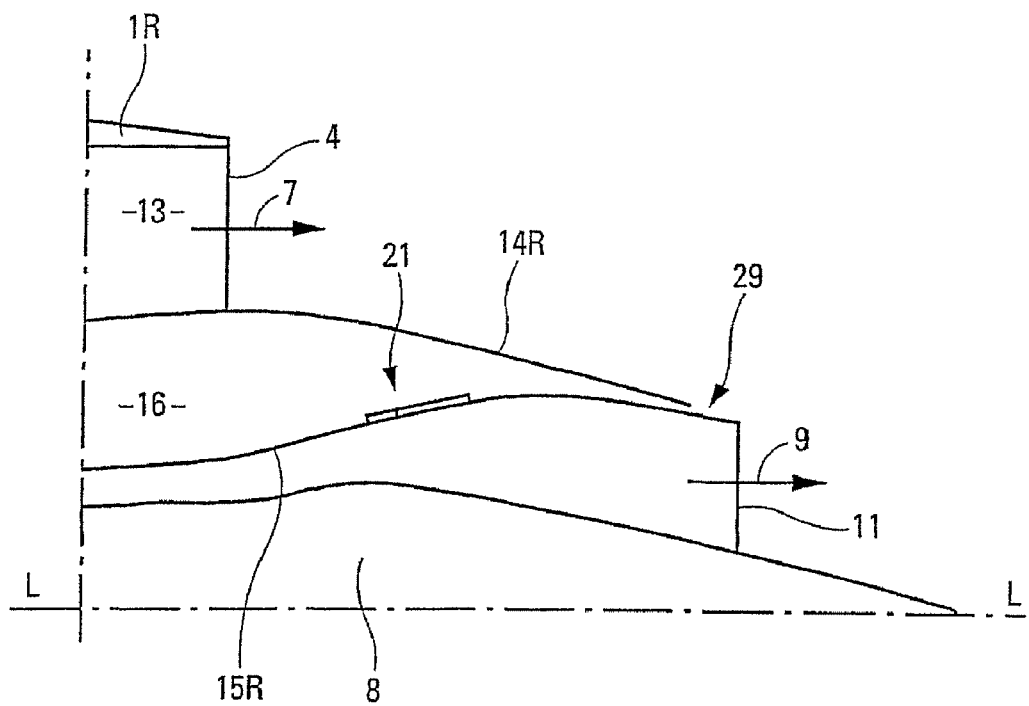
FIGS. 18 and 19 illustrate schematically, in views respectively similar to FIGS. 16 and 17, a first variant application of the present invention to the turbine engine of FIG. 15.
Figure 19:
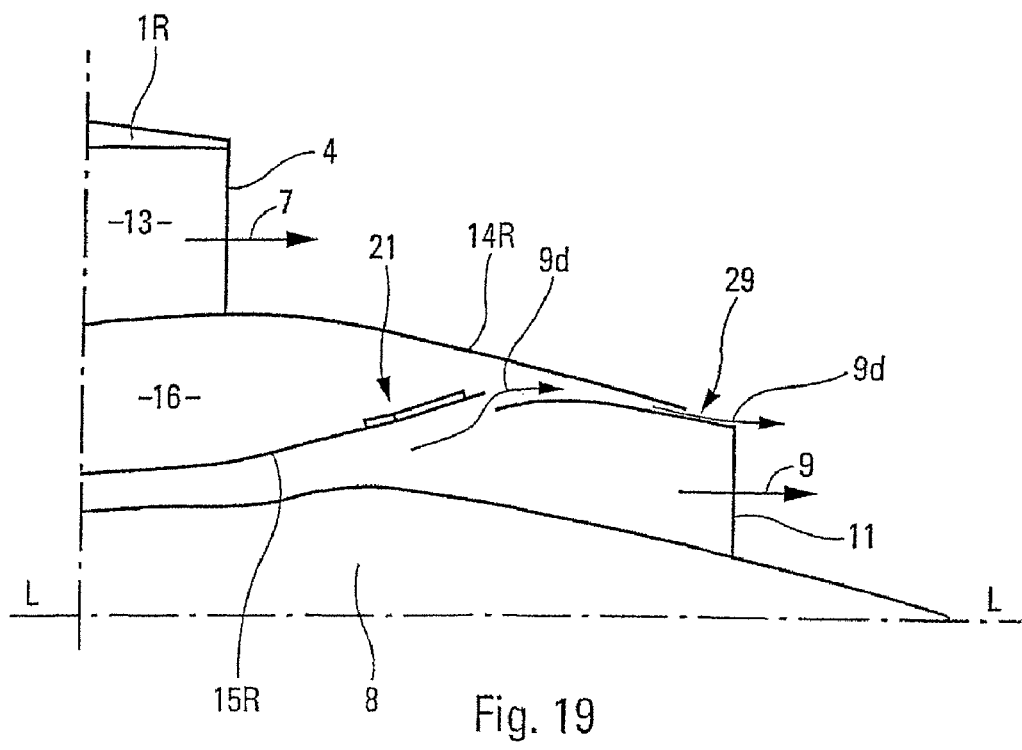
Figure 20:
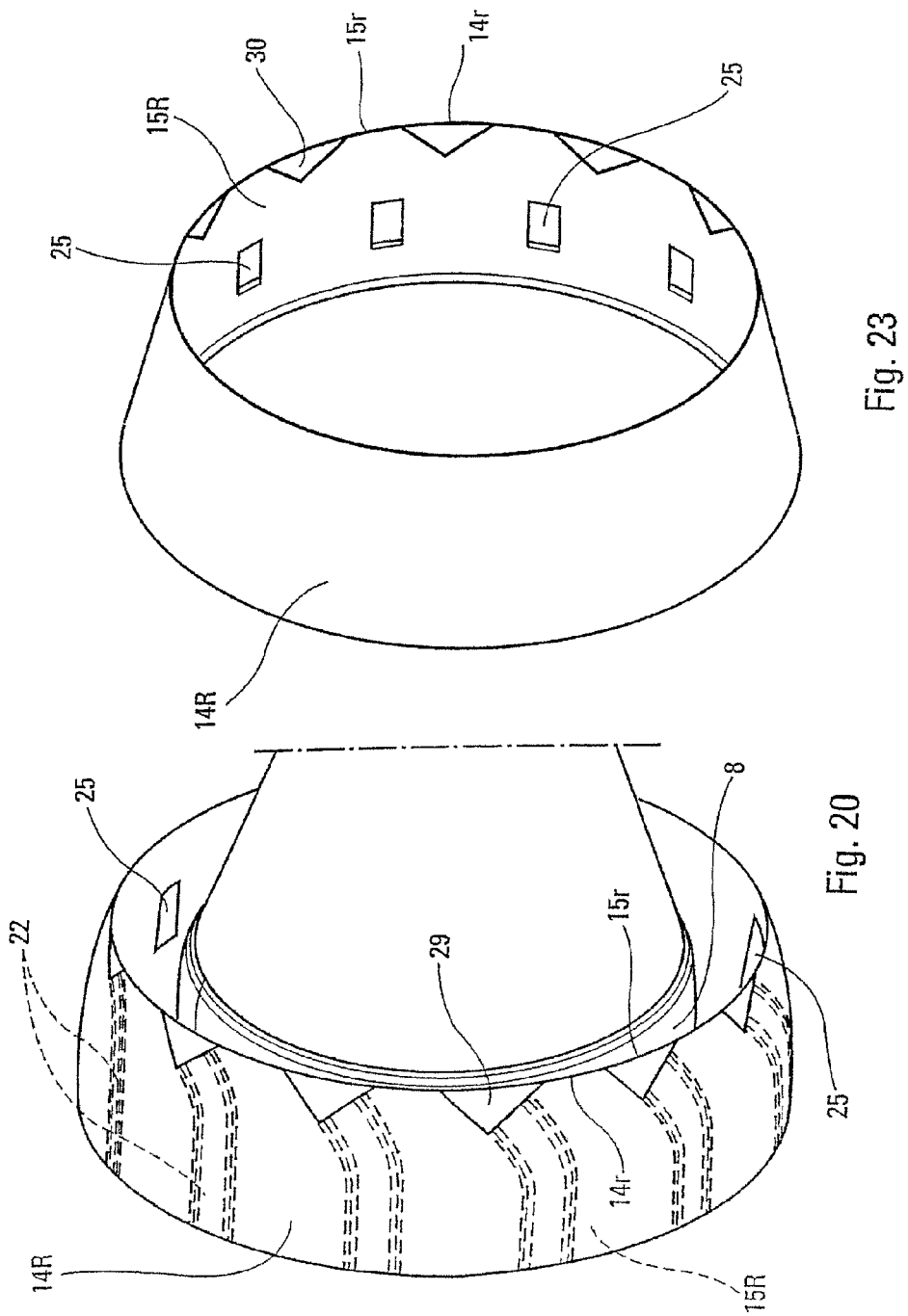
FIG. 20 shows, in a view similar to FIG. 11, an exemplary embodiment of the rear portion of the hot flow generator of the turbine engine of FIG. 15 that can be used in the first variant of FIGS. 18 and 19.
Figure 21:
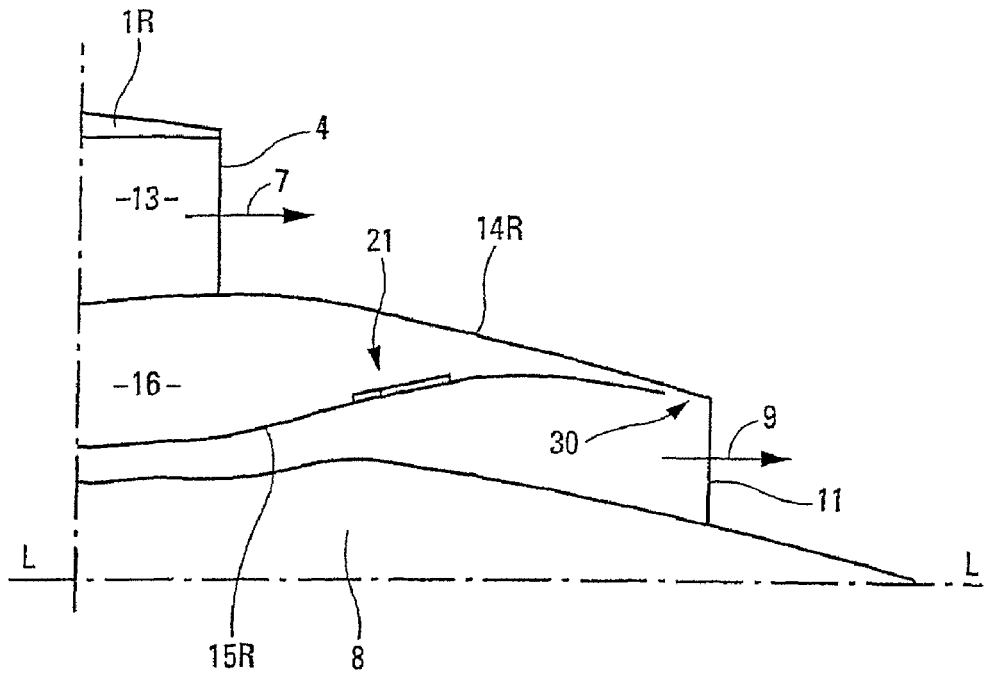
FIGS. 21 and 22 illustrate schematically, in views respectively similar to FIGS. 16 and 17, a second variant application of the present invention to the turbine engine of FIG. 15.
Figure 22:
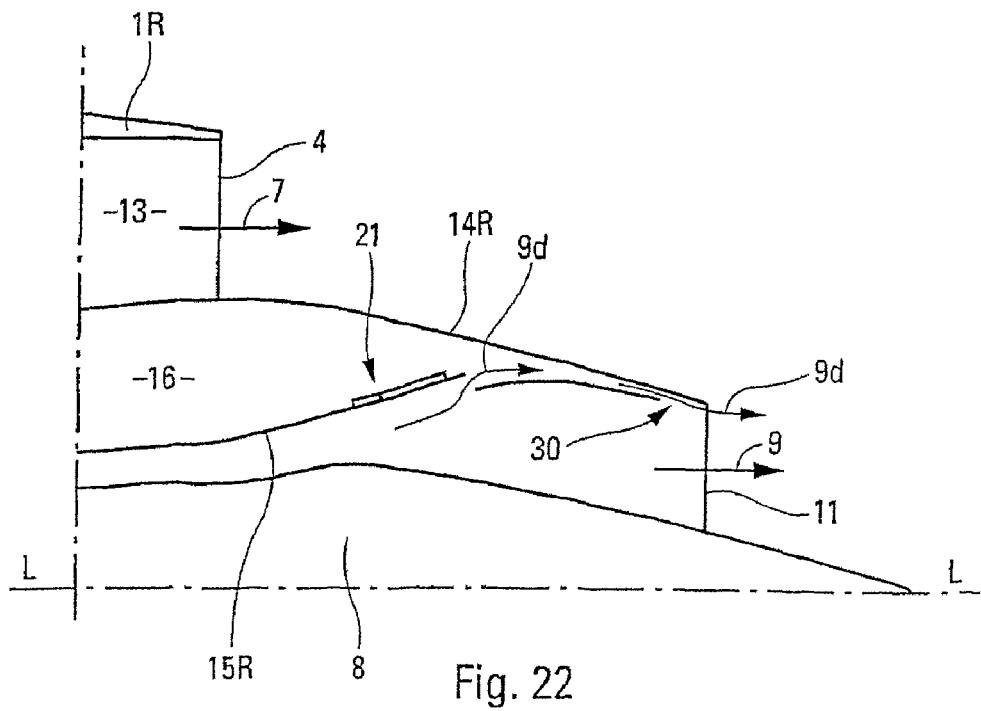

Consequently, for the escape of the jets of hot air 9d to the outside for the purpose of forming turbulence capable of attenuating the jet noise of said turbine engine, it is possible:
- as illustrated by FIGS. 16 and 17, to make openings 31 in the fan inner cowl 14, in the vicinity of the outlet orifice 11 of the hot flow 9;
- as illustrated by FIGS. 18, 19 and 20, to make recesses 29 only in the rear edge 14r, the rear edge 15r remaining smooth; or
- as illustrated by FIGS. 21, 22 and 23, to make recesses 30 only in the rear edge 15r, the rear edge 14r remaining smooth.

Therefore, in the embodiments of FIGS. 16 to 23, the openings 31 and the recesses 29 and 30 are used specifically for the jets of hot air 9d to pass through.

The invention claimed is:
1. A turbofan turbine engine for an aircraft, comprising:
a hollow nacelle having a longitudinal axis and comprising, at the front, an air inlet and, at the rear, an air outlet;
a fan placed axially in said nacelle opposite said air inlet and capable of generating the cold flow of said turbine engine;
a generator placed axially in said nacelle, behind said fan, said generator being capable of generating the axial hot flow of said turbine engine surrounded by said cold flow and being enclosed in an engine cowl; and a fan channel inner cowl coaxially surrounding said hot flow generator so as:

to delimit with the nacelle a channel of annular section for said cold flow, the channel terminates in said air outlet of the nacelle;

to delimit with said engine cowl an intermediate chamber of annular section; and to converge via a rear portion of the fan channel inner cowl with a rear portion of said engine cowl so that respective rear edges of the rear portions form an edge of an outlet orifice of said hot flow at a rear portion of said intermediate chamber, wherein:

provided in the rear portion of said intermediate chamber are communication means placed about said longitudinal axis and configured to place said intermediate chamber in communication with the outside, in the vicinity of a boundary between said cold flow and said hot flow;

a plurality of hatches are provided that are arranged in said rear portion of the engine cowl, while being distributed on the periphery of the rear portion of the engine cowl;

said hatches are opened only when the speed of said turbine engine is greater than a threshold corresponding to at least the cruising speed of the aircraft; and in the open position, said hatches draw off, from said hot flow, individual jets of hot air flowing into said intermediate chamber before leaving the intermediate chamber through said communication means while being distributed about said longitudinal axis.

2. The turbine engine as claimed in claim 1, wherein said communication means comprise a plurality of individual communication openings distributed on the periphery of said rear portion of the intermediate chamber.

3. The turbine engine as claimed in claim 1, in which, on the periphery of said outlet orifice of the hot flow, only one of said rear edges of said fan channel inner cowl or of said engine cowl is notched by recesses for attenuating the jet noise of said turbine engine, wherein said recesses form at least in part said communication means.

4. The turbine engine as claimed in claim 3, in which each recess has at least the approximate shape of a triangle, wherein an individual jet of hot air flows out in the corresponding recess through a side edge of said recess.

5. The turbine engine as claimed in claim 1, in which said rear edges of said fan channel inner cowl and of said engine cowl arrange between them a slot, wherein at least portions of said slot form at least in part said communication means.

6. The turbine engine as claimed in claim 1, wherein said threshold is such that said hatches are opened on take-off of the aircraft.

7. The turbine engine as claimed in claim 1, for an aircraft comprising a plurality of such turbine engines, wherein said threshold is such that said hatches are opened for the speed that must be adopted, in the case of a failure of at least one of said turbine engines, by those of said turbine engines that are in working order.

8. The turbine engine as claimed in claim 1, wherein with each hatch is associated a closing and opening system sensitive to the value of a physical magnitude characterizing the state of said hot flow.

9. The turbine engine as claimed in claim 8, wherein each closing and opening system of a hatch comprises a bimetallic strip.

10. The turbine engine as claimed in claim 9, wherein each hatch comprises an elastic strip configured to interact with an opening made in said rear portion of said engine cowl, said elastic strip is fixedly attached to said rear portion along an edge of said opening and said bimetallic strip system is fixedly attached, on one side, to said rear portion and, on the other side, to said elastic strip.

11. The turbine engine as claimed in claim 1, wherein said hatches are opened in the direction of said intermediate chamber.

12. The turbine engine as claimed in claim 8, wherein said system for closing and opening each hatch is on the side of said intermediate chamber.

13. The turbine engine as claimed in claim 1, wherein, on a side of said intermediate chamber, each hatch is protected by a rearward-opening casing.

14. The turbine engine as claimed in claim 1, wherein, provided behind said hatches are means for the guidance of said jets of hot air.

15. The turbine engine as claimed in claim 13, wherein said guidance means comprise said protective casings.

* * * * *